Nov. 17, 1925.
N. W. BALLEW
VACUUM INSULATED CONTAINER
Filed Oct. 26, 1921
1,561,769
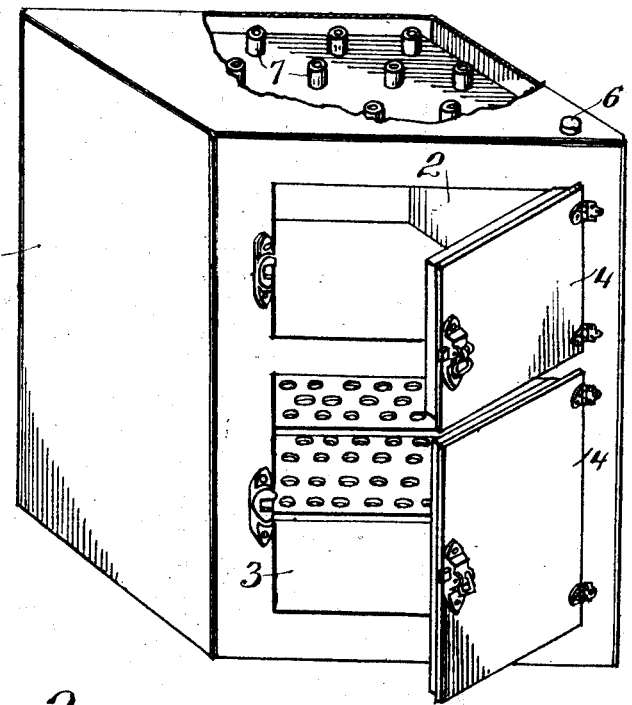
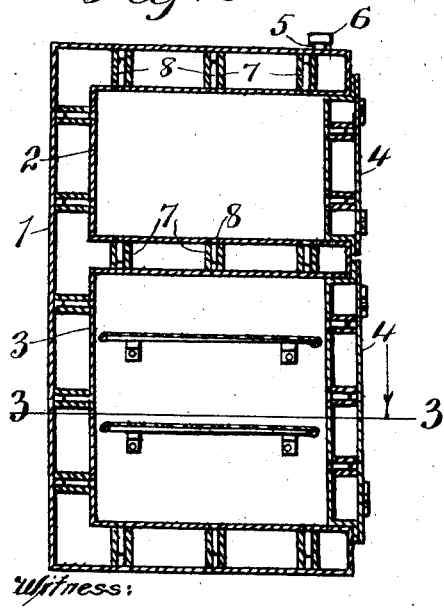
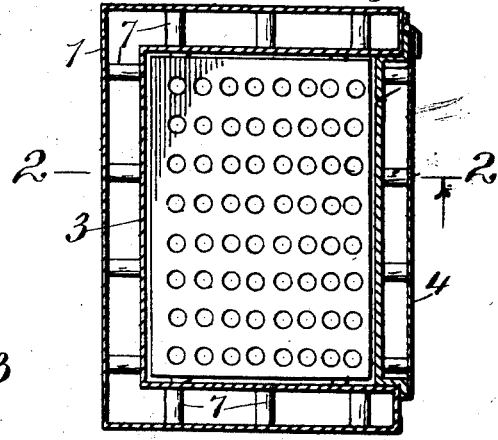

Patented Nov. 17, 1925.

1,561,769

UNITED STATES PATENT OFFICE.

NEUAL W. BALLEW, OF KANSAS CITY, MISSOURI.

VACUUM-INSULATED CONTAINER.

Application filed October 26, 1921. Serial No. 510,520.

*To all whom it may concern:*

Be it known that I, NEUAL W. BALLEW, a citizen of the United States, residing at Kansas City, in the county of Jackson and State of Missouri, have invented a certain new and useful Improvement in Vacuum-Insulated Containers, of which the following is a specification.

My invention relates to improvements in vacuum insulated containers.

The object of my invention is to provide a container of the kind described which is simple, cheap to make, not liable to get out of order, which is durable and strong, and in which articles may be kept cold while other articles are kept hot.

The further object of my invention is to provide novel means of supporting the inner shells and heat insulating them from each other and from an outer containing shell in which they are mounted.

The novel features of my invention are hereinafter fully described and claimed.

In the accompanying drawing which illustrates the preferred embodiment of my invention, Fig. 1 is a perspective view, partly broken away of my improved container.

Fig. 2 is a vertical sectional view on the line 2—2 of Fig. 3.

Fig. 3 is a horizontal sectional view on the line 3—3 of Fig. 2.

Similar reference characters designate similar parts in the different views.

1 designates the outer air tight shell, which may be of any desired shape, and which, in the drawing is shown as rectangular. Mounted in the shell 1, one above the other, and spaced apart on five sides from the shell 1 are an upper inner shell 2 and a lower inner shell 3. Each of the shells 2 and 3 has an open end attached to the adjacent side of the outer shell 1. The open end comprises a doorway which is adapted to be normally closed by a door 4 hinged to the front side of the shell 1.

The air between the inner shells and between the latter and the outer shell is substantially exhausted, an exhaust tube 5 being provided, at the outer side of the shell 1 having a removable closure 6, by which the air may be withdrawn by a suitable air pump mechanism, not shown.

Heat insulating spacing and supporting means are provided between the shells 2 and 3 and between the latter and the shell 1. For this purpose there may be provided heat insulating spools of wood or other suitable material, designated by 7, which spools extend from the inner shells to the outer shell and from one inner shell to the other. For supporting the spools 7 in operative position, the inner shells may be provided with laterally extending pins 8 which extend toward the outer shell 1 but which do not touch said shell. Similar pins may be provided on the shell 2 and extending toward but not touching the shell 3. The spools 7 are respectively mounted on the pins 8.

In the operation of my invention, ice may be placed in the lower shell 3, so as to keep things in this shell cold. Hot or warm articles may be placed in the upper shell 2. The articles in the upepr shell will be kept warm and the articles in the lower shell will be kept cold. The door 4 of either shell may be opened without affecting the temperature in the other inner shell.

The inner shells each contact with the outer shell only over a small surface at its front end. The doors 4, where they contact with the outer shell may be lined with a suitable heat insulating material, such as cork or asbestos, not shown.

I do not limit my invention to the structure shown and described, as many modifications, within the scope of the appended claim, may be made without departing from the spirit of my invention.

What I claim is:—

A vacuum insulated container comprising an outer air tight shell, two inner shells mounted therein and spaced apart therefrom and from each other, each inner shell having a doorway and a door therefor, the air between the shells being substantially exhausted, and insulating bracing members extending between the inner shells and between the latter and the outer shell, substantially as set forth.

In testimony whereof I have signed my name to this specification.

NEUAL W. BALLEW.